April 18, 1933.  J. E. COLLINS  1,904,977
MACHINE FOR MAKING GLASS STOPPERS AND THE LIKE
Filed Oct. 1, 1930  4 Sheets-Sheet 3

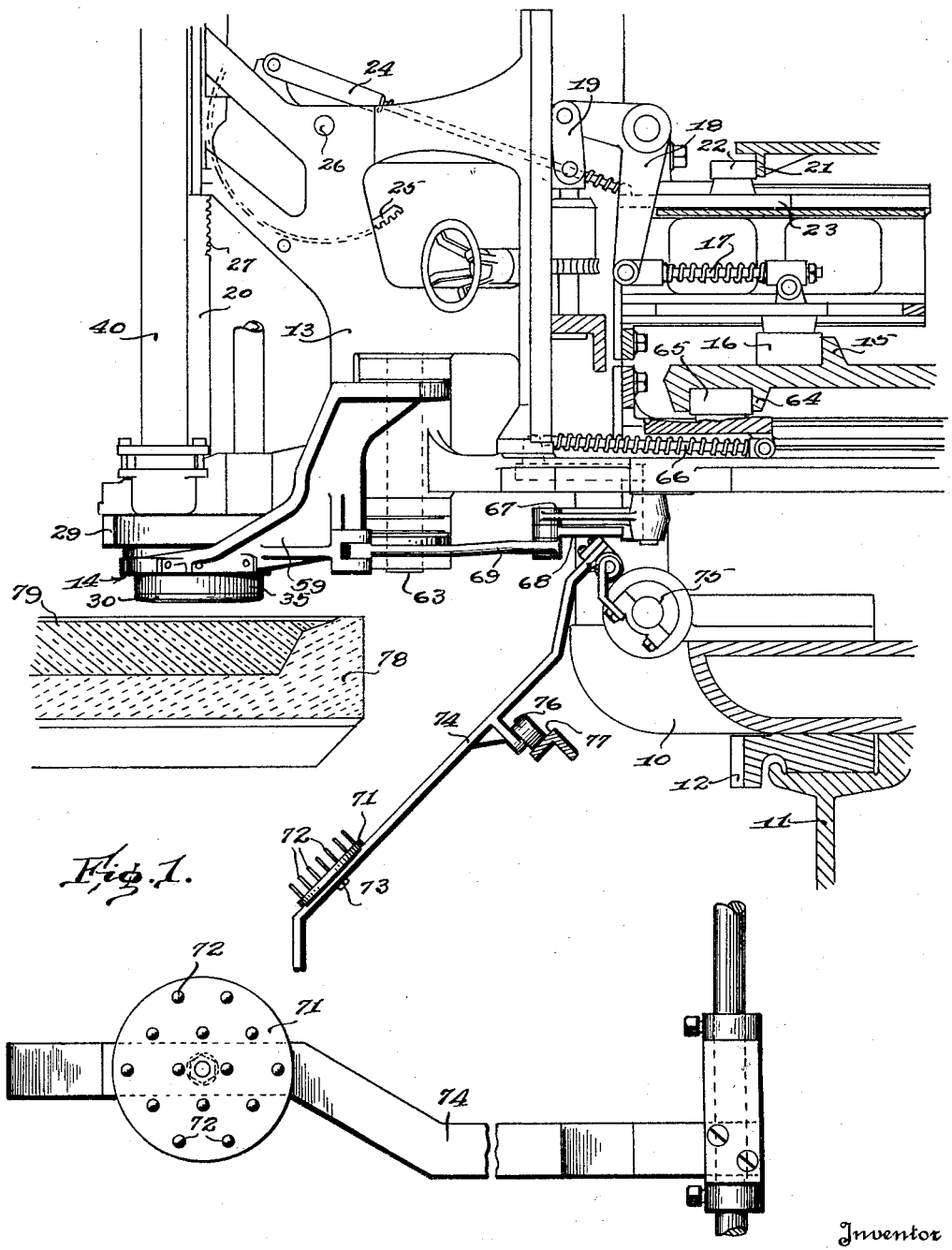

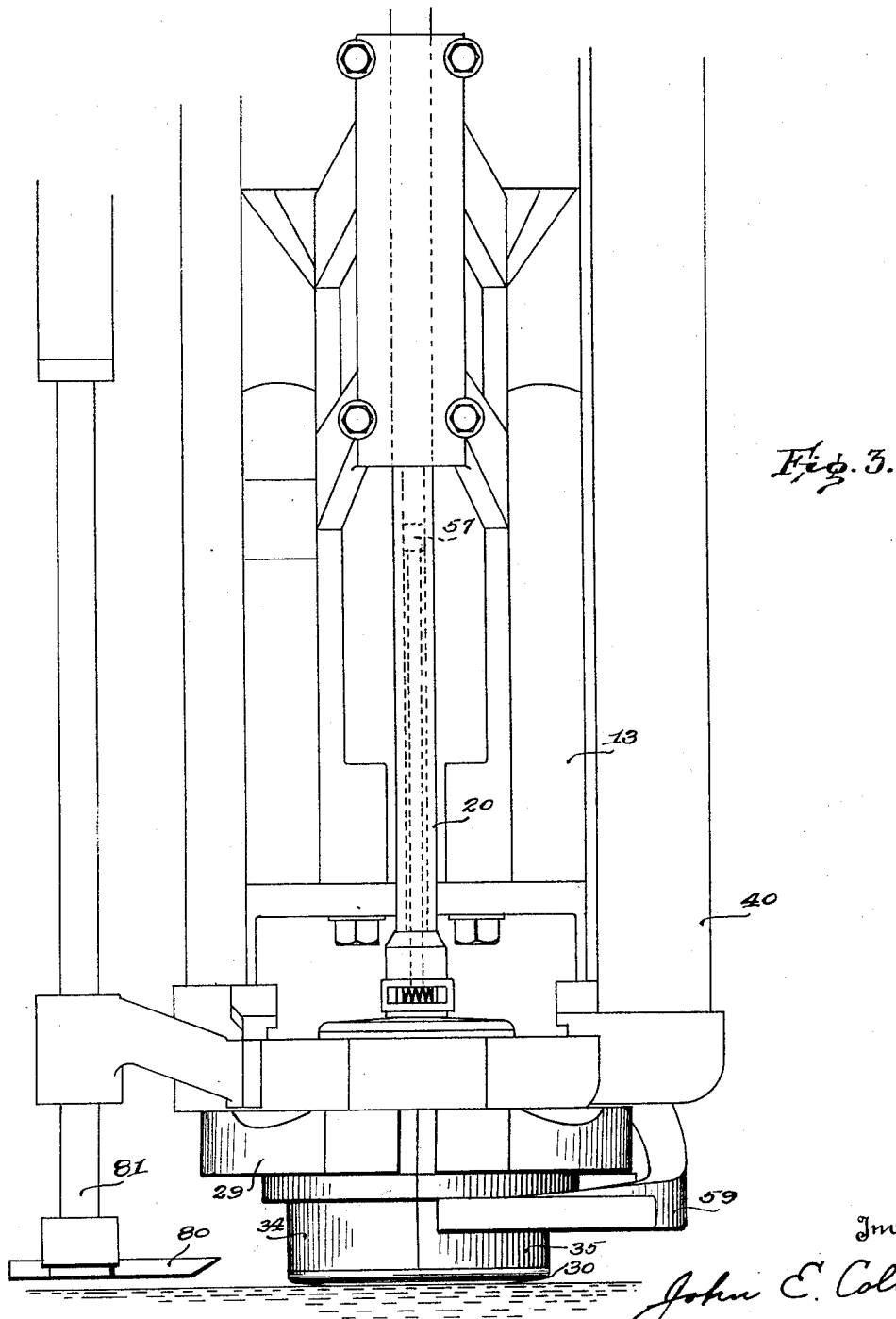

Inventor
John E. Collins
By J. F. Rule, Attorney

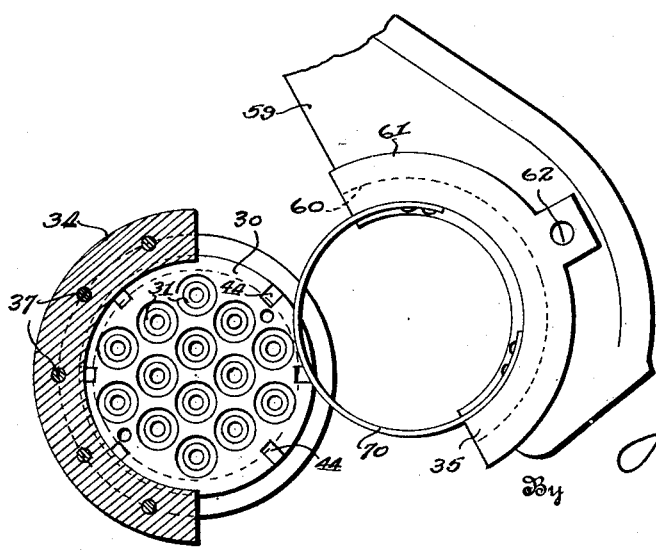

Patented Apr. 18, 1933                                                    1,904,977

UNITED STATES PATENT OFFICE

JOHN E. COLLINS, OF ALTON, ILLINOIS, ASSIGNOR TO OWENS-ILLINOIS GLASS COMPANY, A CORPORATION OF OHIO

MACHINE FOR MAKING GLASS STOPPERS AND THE LIKE

Application filed October 1, 1930. Serial No. 485,589.

My invention relates to machines for molding bottle stoppers or other glass articles.

An object of the invention is to provide a suction gathering machine with which a large number of glass stoppers or similar articles may be simultaneously formed in a block mold, thereby obtaining a large output from the machine.

Other objects of the invention will appear hereinafter.

In the accompanying drawings:

Fig. 1 is a fragmentary sectional side elevation of a machine embodying the present invention.

Fig. 2 is a plan view of an ejector device for ejecting the articles from the mold.

Fig. 3 is a front elevation showing one head or unit of the machine.

Figs. 6 and 7 are sectional views similar to Fig. 4, showing the relative position of parts at different stages during a cycle of operations.

Fig. 8 is a fragmentary plan view, partly in section, showing the lower mold plate and means for sweeping the molded articles off said plate.

Figure 4:
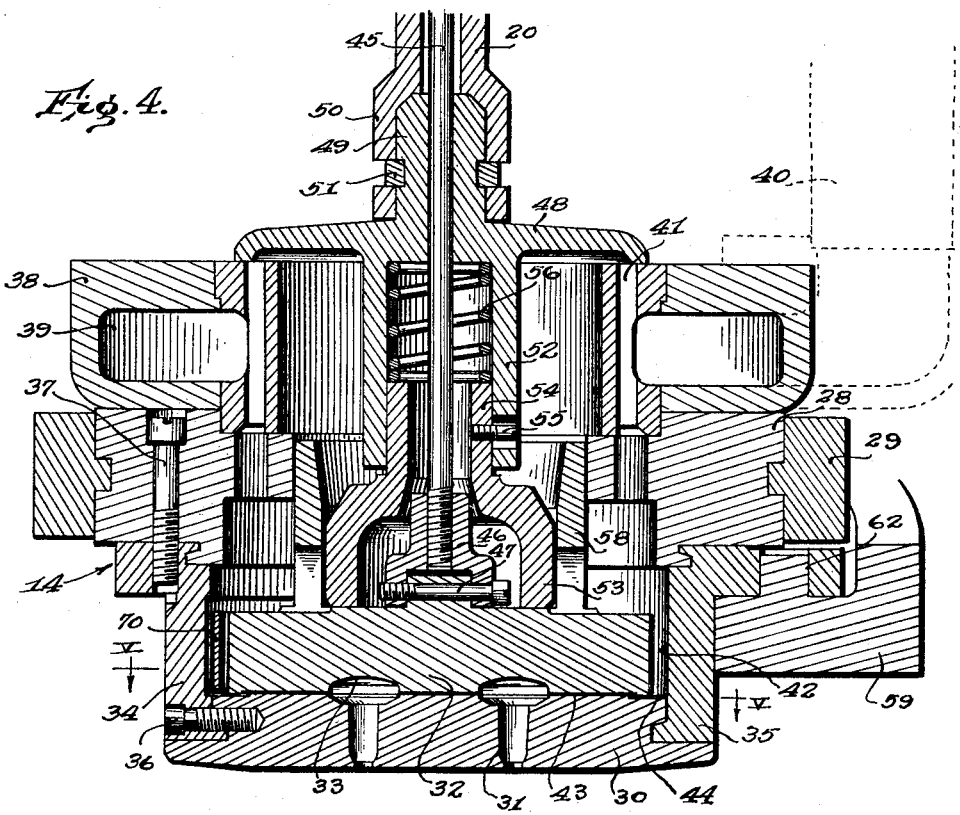
Fig. 4 is a sectional elevation on a larger scale of the mold and associated parts.

Referring particularly to Fig. 1, the invention is herein illustrated as adapted to an Owens type of suction gathering machine. This machine comprises a mold carriage 10 which may be rotated continuously about a central stationary column 11, by any suitable mechanism including a ring gear 12 on the carriage. An annular series of units may be mounted on the carriage, each comprising a dip head frame 13 carrying a dip head 14. The means for moving said head up and down on the mold carriage comprises a stationary cam 15 on which runs a roll 16 having operating connections 17 with a bell crank 18, connected through a link 19 to the frame 13. A plunger 20 supported on the frame 13 is movable up and down relative to said frame by mechanism including a stationary cam 21 on which runs a roll 22 carried by a slide 23 connected through a rod 24 to a segmental rack gear 25 pivoted at 26 on the frame 13 and running in mesh with gear teeth 27 formed on the plunger 20.

The dip head 14, as shown in Fig. 4, comprises an annular supporting member 28 carried by arms 29 on the dip frame. The mold, which is located below the member 28, comprises a lower body mold or block 30 formed with a multiplicity of body mold cavities 31, and an upper head mold or block 32 formed with head mold cavities 33 complemental to the mold cavities 31. Extending circumferentially of the mold block 30 are flange members 34 and 35 which together form an annular wall rising from the plate 30 and providing a housing for the upper mold block 32. The member 34 is secured to the mold block 30 by screws 36 and is secured to the member 28 by screws 37, thereby rigidly connecting the mold block 30 with the supporting member 28. The walls 34 and 35 have a tongue and groove connection with both the member 28 and the mold block 30, thus providing a substantially air tight construction.

Figure 5:
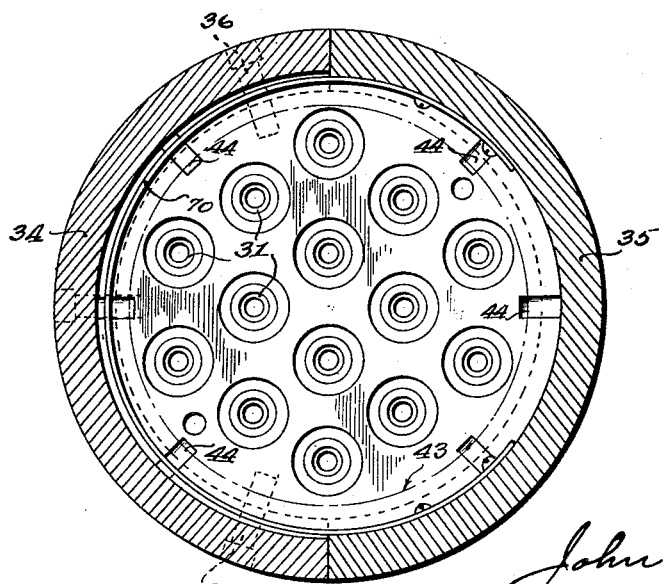
Fig. 5 is a sectional plan taken at the line V—V on Fig. 4.

A vacuum head 38 seated on the supporting member 28 is formed with a vacuum chamber 39 which opens into a vacuum pipe 40 through which the air is intermittently exhausted from the vacuum chamber, as is customary in Owens type machines, for exhausting air from the gathering molds. The vacuum chamber 39 has communication through passageways 41 with a chamber 42 in which the mold block 32 is located. The lower face of the upper mold block is slightly recessed, so that when seated on the lower mold block 30 a space 43 is formed through which the air is exhausted from the mold cavities. The space 43 may communicate through narrow channels 44 (Fig. 5) with the chamber 42.

The upper mold block is movable up and down within the dip head by means including a stem 45, the lower end of which is threaded into a connector 46 attached to the mold block 32 by means of a pivot pin 47. The stem 45 extends freely through a cap 48 which is adapted to seat on the upper face of the vacuum head 38. The cap 48 is formed with a vertical extension 49 which fits in the enlarged end 50 of the rod 20 and is secured therein by a ring 51. Projecting downward from the cap 48 is an integral tubular extension 52. A hollow member or head 53 formed with a hollow stem 54 extends upward into the cap extension 52 and has a telescoping connection therewith. The head 53 is connected to move up and down with the cap 48 by means of a connecting screw 55 threaded into the stem 54 and projecting into an elongated slot formed in the extension 52. The latter provides a housing for a coil spring 56 which is under compression between the upper end of the stem 54 and the lower face of the cap 48.

The rod 20 with the cap 48 and head 53 connected thereto are slidable vertically on the stem 45 from the Fig. 4 position to the Fig. 6 position, the upward movement of the cap independently of said stem being limited by a head 57 attached to the upper end of the stem. Movement of the cap 48 upward from the Fig. 6 to the Fig. 7 position, lifts the upper mold block 32 away from the lower mold block to permit the discharge of the molded articles. The upper mold block is formed with a cylindrical extension 58 which engages the inner face of the supporting member 28 and thereby guides the mold block in its up and down movements. When the cap 48 is seated on the vacuum head, the head 53 is seated on the mold block 32 under the compression of the spring 56, thus forming a substantially air tight seal which prevents the escape of air from the vacuum chamber through the interior of the cap 48.

The section 35 of the mold housing is removably mounted on an arm 59, which arm is formed with a semi-annular recess 60 (Fig. 8) to receive the part 35, the latter formed with a flange 61 to seat on the arm. A lug 62 (Fig. 4) extends upward within a corresponding opening formed in the section 35 for removably holding the latter in position. The arm 59 is mounted to swing about a vertical hinge pin 63 (Fig. 1) under the control of a cam 64. A cam roll 65 running on said cam has operating connections, including a rod 66, with a pair of lever arms 67 and 68, said lever arms in turn being connected through a link 69 to the arm 59.

A ring band 70 attached to the member 35 serves as a wiper for wiping the stoppers or other molded articles off the mold block, as hereinafter described. When the mold is in closed position, the band 70 extends around the upper mold block between the latter and the wall 34.

An ejector for dislodging the molded articles from the mold cavities comprises a disk 71 on which are mounted ejector pins 72 corresponding in position and number to the mold cavities 31. The ejector disk is attached as by means of a bolt 73 to an arm 74 mounted on the mold carriage 10 to swing up and down about a horizontal pivot pin 75. The arm 74 carrier a roll 76 running on a stationary cam track 77 shaped to impart the desired up and down movements to said arm. Molten glass is supplied to the molds from the usual revolving tank 78 or other container in which is a supply body 79 of molten glass.

The operation is as follows:

As the mold carriage 10 rotates, the dip heads 14 are brought in succession to a gathering position over the tank 78 while the ejector 71 travels beneath the tank. When the dip head is over the tank, the cam 15 operates to lower it and thereby bring the body mold block 30 into sealing contact with the glass in the tank. The mold blocks and associated parts are at this time in the relative position shown in Fig. 4. Air is now exhausted through the vacuum pipe 40 so that the glass is drawn upward into and fills the mold cavities. The dip head 14 is now lifted and a knife 80 carried on a vertical rock shaft 81 is operated to shear across the bottom of the mold to the position shown in Fig. 6, thereby severing the glass. After the glass is thus severed, the vacuum is cut off and the rod 20 is moved upward by means of the cam 21 operating through the link 24 and gear 25. The rod 20 in its upward movement, carries with it the cap 48 and the head 53. The mold block 32 remains seated on the lower mold block while the cap 48 is moving upward to the Fig. 6 position, thereby allowing the molded articles time for cooling sufficiently to retain their shape. After the cap 48 reaches the stop 57, the rod 20 during its final upward movement, lifts the stem 45 and upper mold block to the Fig. 7 position. By this time the dip head has passed beyond the tank and the ejector 71 is lifted by its cam 77 so that the ejecting pins 72 force the molded articles upward out of their mold cavities, as shown in Fig. 7. The arm 59 is now swung outward by means of its cam 64, drawing the wiper band 70 across the face of the mold block 30 and thereby wiping the stoppers off the mold into any suitable container (not shown).

Modifications may be resorted to within the spirit and scope of my invention.

What I claim is:

1. In a machine for forming glass articles, the combination of a mold having a downwardly opening mold cavity, means for bringing the mold into gathering relation to a supply body of molten glass and filling the mold by suction, an ejector, and means for moving the ejector upward into the mold cavity and thereby ejecting the molded article from the mold.

2. The combination of a mold carriage, a mold thereon, a container for molten glass, means for driving the mold carriage and thereby moving the mold over the glass, means for filling the mold by suction, an ejector supported on the mold carriage, and means for moving the ejector upward beneath the mold and causing it to force the molded article upwardly out of the mold cavity.

3. The combination of a mold carriage, a mold thereon, a container for molten glass, means for driving the mold carriage and thereby moving the mold over the glass, means for filling the mold by suction, an ejector mounted to travel with the mold carriage and arranged to pass beneath said container, and means to move the ejector upward into the mold cavity for dislodging an article from the mold cavity.

4. In a machine for forming glass articles, the combination of upper and lower mold blocks having complementary mold cavities therein, the mold cavity in the lower block opening downward through said block, means for introducing molten glass by suction through said opening, means for separating the mold blocks by a relative vertical movement, leaving the articles supported in the lower mold block, and means for ejecting the article from the mold.

5. In a machine for forming glass articles, the combination of upper and lower mold blocks having complementary mold cavities therein, the mold cavity in the lower block opening downward through said block, means for introducing molten glass by suction through said opening, means for withdrawing the upper mold block and leaving the article supported in the lower mold block.

6. In a machine for forming glass articles, the combination of a mold having a mold cavity therein, means forming with the mold an enclosed chamber having communication with the mold cavity, means for bringing the mold into operative relation to a supply body of molten glass, means for exhausting air from said chamber and the mold cavity and thereby filling the mold cavity with glass, and means for ejecting the molded article from the mold cavity into said chamber.

7. The combination of a mold block having opposite flat faces and a multiplicity of mold cavities extending therethrough from one said face to the other, a cooperating mold block having mold cavities complementary to and in register with the first mentioned cavities, means for introducing charges of glass by suction into the mold cavities while the mold blocks are together, means for severing the glass at one of said faces during said registration of the mold cavities, means for separating said blocks, and means for ejecting the formed articles.

8. The combination of a mold block having a plurality of mold cavities therein, means for forming glass articles in said cavities, means for ejecting the articles from the mold cavities and leaving them supported on the upper face of the mold block, a wiper comprising a band surrounding said articles, and means for moving said band across the face of the mold for removing the articles.

9. The combination of a lower mold block having mold cavities therein, an upper mold block arranged to seat on the lower block and having complementary mold cavities therein, means for introducing glass into the mold cavities and forming glass articles therein, a wiper surrounding the upper mold block, means for lifting the upper mold block, means for dislodging the articles from the mold cavities, and means for moving said wiper laterally and thereby sweeping the articles from the lower mold block.

10. The combination of a suction gathering mold, means cooperating therewith to form a vacuum chamber, and means for transferring an article formed in the mold from the mold cavity into a portion of said chamber exterior to the mold cavity.

11. The combination of a mold block having mold cavities therein opening downwardly through said block, means providing a wall surrounding and rising from said block, means cooperating with said wall for forming a vacuum chamber, means for exhausting the air from said chamber and the mold cavities for filling the mold cavities with molten glass by suction, means for moving the formed articles from the cavities into said chamber, and means for removing the articles from said chamber.

12. The combination of the lower mold block having a multiplicity of mold cavities extending therethrough, an upper cooperating mold block having mold cavities complementary to and in register with the first mentioned cavities, means providing a vacuum chamber in which the upper mold block is located, means for exhausting the air from said chamber and introducing molten glass by suction into the mold cavities, means for separating the mold blocks, means for ejecting the molded articles from the mold cavities into said chamber between the mold blocks, and means for removing the articles from said chamber.

13. The combination of a mold having a charge receiving opening and a discharge opening at opposite ends thereof, means for introducing a charge of glass by suction into the mold through said charge receiving opening, a cutter, means for moving the cutter across said charge receiving opening for severing the glass, an ejector, and means for moving the ejector into said charge receiving opening and ejecting the article from the mold through said discharge opening.

14. In a machine for forming glass articles, the combination of a mold block having a multiplicity of mold cavities formed in and extending through said block from one face thereof to the other, means for introducing molten glass by suction into the mold cavities through one said face of the mold block, and means operating through said last mentioned face to eject the articles through the opposite face of the mold block.

15. In combination, a stopper forming unit including a horizontally disposed mold block in which finished stoppers are supported preparatory to their removal from the unit, stopper removing mechanism including means for lifting and pushing the stoppers, and means for actuating said mechanism and thereby causing the stoppers to be first lifted vertically and then pushed laterally from the mold block.

16. In a machine for forming glass articles, the combination of upper and lower mold blocks having complementary mold cavities therein, the mold cavity in the lower block opening downward through said block, means for introducing molten glass by suction through said opening, means for separating the mold blocks by a relative vertical movement, leaving the article supported in the lower mold block, and mechanism for ejecting the article from the mold comprising means for lifting the article relative to the lower mold block, and means for then pushing it laterally from the mold block.

Signed at Alton, Illinois, this 26th day of September 1930.

JOHN E. COLLINS.